(12) United States Patent
Nakamura et al.

(10) Patent No.: US 7,514,163 B2
(45) Date of Patent: Apr. 7, 2009

(54) MAGNETIC RECORDING MEDIUM AND MAGNETIC RECORDING DEVICE

(75) Inventors: Norikazu Nakamura, Kawasaki (JP); Tsukasa Itani, Kawasaki (JP); Yukiko Oshikubo, Kawasaki (JP); Shinichi Nakayama, Higashine (JP); Takashi Toyoguchi, Higashine (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 10/982,198

(22) Filed: Nov. 4, 2004

(65) Prior Publication Data
US 2005/0271902 A1 Dec. 8, 2005

(30) Foreign Application Priority Data
Jun. 8, 2004 (JP) ............................. 2004-170275

(51) Int. Cl.
*G11B 5/66* (2006.01)
(52) U.S. Cl. ................................. 428/833.2
(58) Field of Classification Search ........................ None
See application file for complete search history.

(56) References Cited

U.S. PATENT DOCUMENTS

| 6,132,875 | A | * | 10/2000 | Kiuchi et al. | ............... | 428/408 |
| 6,245,417 | B1 | | 6/2001 | Huang | | |
| 6,303,214 | B1 | * | 10/2001 | Chour et al. | ................ | 428/212 |
| 6,329,037 | B1 | * | 12/2001 | Kokaku et al. | .............. | 428/814 |
| 6,875,492 | B1 | * | 4/2005 | Pirzada et al. | ........... | 428/833.2 |
| 2001/0004499 | A1 | * | 6/2001 | Horng et al. | .......... | 428/694 TC |
| 2005/0181238 | A1 | * | 8/2005 | Ma et al. | .................... | 428/834 |
| 2006/0044691 | A1 | * | 3/2006 | Nakamura et al. | ....... | 360/235.1 |

FOREIGN PATENT DOCUMENTS

| JP | A 1-201819 | 8/1989 |
| JP | 7-326033 | 12/1995 |
| JP | 10-091940 | 4/1998 |
| JP | 11-175960 | 7/1999 |
| JP | 2001-043526 | 2/2001 |
| JP | 2001-325717 | 11/2001 |
| JP | A 2002-502081 | 1/2002 |
| JP | 2002-150529 | 5/2002 |

OTHER PUBLICATIONS

Hyodo et al.; "Properties of Tetrahedral Amorphous Carbon Film by Filtered Cathodic Arc Deposition for Disk Overcoat"; IEEE Trans. on Magnetics, vol. 37, No. 4; pp. 1789-1791; Jul. 2001.

(Continued)

*Primary Examiner*—Holly Rickman
(74) *Attorney, Agent, or Firm*—Greer, Burns & Crain, Ltd.

(57) ABSTRACT

A magnetic recording medium having excellent durability and corrosion resistance as well as a magnetic recording device equipped with the magnetic recording medium is provided. The protective layer of the magnetic recording medium is composed of two layers, that is, a lower layer contacting with the magnetic layer and an upper layer on the lower layer. The internal stress of the lower layer is made smaller than that of the upper layer, and the surface free energy of the lower layer is made smaller than that of the upper layer.

12 Claims, 4 Drawing Sheets

OTHER PUBLICATIONS

Weiler et al.; "Preparation and properties of highly tetrahedral hydrogenated amorphous carbon"; Physical Review B, vol. 53, No. 3; Jan. 15, 1996; pp. 1594-1608.

Fallon et al.; "Properties of filtered-ion-beam-deposited diamondlike carbon as a function of ion energy"; Physical Review B, vol. 48, No. 7; Aug. 15, 1993; pp. 4777-4782.

Tamor et al.; "Atomic constraint in hydrogenated "diamond-like" carbon"; Appl. Phys. Lett. 58; Feb. 11, 1991; pp. 592-594.

Kaplan et al.; "Characterization of amorphous carbon-hydrogen films by solid-state nuclear magnetic resonance"; Appl. Phys. Lett. 47; Oct. 1, 1985; pp. 750-753.

Grill et al.; "Characterization of diamondlike carbon by infrared spectroscopy?"; Appl. Phys. Lett. 68; Apr. 27, 1992; pp. 20892091.

"Properties of Amorphous Carbon"; emis Datareviews Series No. 29; The Institution of Electrical Engineers, Herts, United Kingdom.

Ban et al.; "Stress and structural properties of diamond-like carbon films deposited by electron beam excited plasma CVD"; Diamond and Related Materials 12 (2203) pp. 47-56; 2002.

\* cited by examiner

MAGNETIC RECORDING MEDIUM AND MAGNETIC RECORDING DEVICE

CROSS-REFERENCE TO RELATED APPLICATIONS

This application is based upon and claims the benefit of priority from the prior Japanese Patent Application No. 2004-170275, filed on Jun. 8, 2004, the entire contents of which are incorporated herein by reference.

BACKGROUND OF THE INVENTION

1. Field of the Invention

The present invention relates to a magnetic recording medium.

2. Description of the Related Art

A hard disk drive that is one of magnetic recording devices with floating of a record converting element (or a head) that is an information recording unit, is widely used as an external storing unit for computers and other various information terminals, in general.

Current magnetic disks employ, as a magnetic layer, a thin magnetic alloy layer made of a cobalt alloy indicating good magnetic properties on a hard nonmagnetic substrate. However, the magnetic alloy layer is significantly inferior in durability and corrosion resistance, and tends to cause degradation of magnetic properties and mechanical or chemical damage, owing to friction through contact with or sliding on a head, and corrosion generated by the wear and moisture adsorption. Accordingly, as matters now stand, a protective layer is laid over the surface of the magnetic alloy layer, and a lubricant layer made of a lubricant is laid on the protective layer so as to improve the durability and corrosion resistance.

As the protective layer, various materials such as $SiO_2$ and $Al_2O_3$ are used. However, it is presently considered that a carbon-type protective layer comprising carbon such as an amorphous carbon is desirable as a protective layer for a magnetic recording medium as well as a head, in terms of thermal stability, corrosion resistance and wear resistance. Carbon-type protective layers deposited by the sputtering method and the CVD (Chemical Vapor Deposition) method are generally used.

In the current information-intensive society, the amount of information to be handled shows a tendency to increase in every application. Accordingly, further increase of recording density and storage volume is anxiously anticipated for magnetic recording discs. In order to meet the requirement for a higher recording density, it is indispensable to shorten the distance between the magnetic layer and the information recording/reading part of the head, that is, so-called magnetic spacing, and therefore, it is believed necessary to make thinner the protective layer itself.

Accordingly, there has been increasing a strong need for a protective layer that can secure a sufficient durability even if it is as extremely thin as 5 nm or less. In recent years, the Filtered Cathodic Arc method (the FCA method) has drawn great attention by which it is possible to form a protective layer having better durability than a conventional protective layer (see IEEE TRANSACTIONS ON MAGNETICS, H. Hyodo, et al., vol. 37. p. 1789-1791, July 2001).

An amorphous carbon can be prepared by the FCA method as follows. FIG. 3 is a schematic view of a FCA deposition system to perform the FCA method. In reference to FIG. 3, a carbon source such as graphite is used as a cathode 31. Arc discharging is caused between the cathode 31 and an anode 32 to generate carbon ions, electrons, carbon neural atoms and carbon macroparticles, from which the carbon neutral atoms and carbon macroparticles are removed by magnetic filters (filter coils 33 and 34) so that only the carbon ions and electrons are sent to a substrate 35. Thus, a DLC (diamond-like carbon) layer 36 is formed on the substrate. An ion gun 37 is used for doping with other elements.

With the FCA method, it is easy, based on the deposition principle, to increase the amount of $sp^3$ bonding that is generally called diamond bonding, to 50% or more of the total amount. Accordingly, it is possible to realize a hardness and density similar to those of diamond in an amorphous form. However, a protective layer formed by the FCA method has a disadvantage that it is liable to be exfoliated from the magnetic layer to be protected, owing to its large internal stress.

It has been also found that though a protective layer formed by the FCA method has a high coating capability as a film, it is inferior in corrosion resistance to protective layers formed by the conventional methods, and the inferiority becomes more significant when it is thinner. It is considered that it is caused indirectly by the high internal stress that the FCA film has. That is, it is supposed that damage of the protective layer owing to the release of the stress occurs at an interface of the protective layer and a magnetic layer that has undergone corrosion, with the result that corrosion at the exfoliated surface of the protective layer is accelerated.

Furthermore, though a protective layer formed by the FCA method has a high coating capability as a film, there is a problem that corrosion of the magnetic layer occurs, caused by the moisture that has intruded into the magnetic layer through small defected parts such as pin holes, when the protective layer is as extremely thin as 5 nm or less. Such a problem cannot be ignored.

Because of the present status as described above, it is difficult to readily apply an amorphous carbon protective layer formed by the FCA method from the viewpoint of a protective layer for the magnetic recording medium, though it is surely excellent in mechanical strength.

It is an object of the present invention to solve these problems, and to provide a magnetic recording medium having excellent durability and corrosion resistance as well as a magnetic recording device equipped with the magnetic recording medium. Other objects and advantages of the present invention will be clarified through the following explanation.

SUMMARY OF THE INVENTION

According to one aspect of the present invention, a magnetic recording medium formed by layering on a substrate, a magnetic layer, a protective layer and a lubricant layer in this order, wherein the protective layer is composed of two layers, that is, a lower layer contacting with the magnetic layer and an upper layer on the lower layer, and the internal stress of the lower layer is smaller than that of the upper layer and the surface free energy of the lower layer is smaller than that of the upper layer, is provided.

Preferable are that at least one of the lower layer and the upper layer is formed by deposition by the Filtered Cathodic Arc method; that the upper layer comprises an amorphous carbon as a main component; in particular that not less than 90 atom % of the upper layer is composed of carbon; that the lower layer comprises an amorphous carbon and at least one of hydrogen and fluorine, as main components; that 50 to 80 atom % of the lower layer is composed of carbon; that the total content of hydrogen and fluorine in the lower layer is larger than that of the upper layer; that the composition of the lower layer is formed by adding hydrogen, or fluorine, or hydrogen and fluorine to a composition that is the same as that of the upper layer; that the lower layer has an internal stress of not more than 5 GPa; that the lower layer has a surface free energy of not more than 40 mN/m; that the upper layer has a hardness of not less than 20 GPa; that the upper layer has a density of not less than 2.5 g/cm$^3$; that the ratio of the film thickness of the lower layer to that of the upper layer is in the range of from 3:7 to 7:3; and that the film thickness of the protective layer is not more than 5 nm. By the present invention, it is possible to provide a magnetic recording medium having high durability and corrosion resistance through the relaxation of the internal stress.

According to another aspect of the present invention, a magnetic recording device equipped with the above-described magnetic recording medium is also provided.

By the present invention, a magnetic recording medium having high durability and corrosion resistance as well as a magnetic recording device equipped with the above-described magnetic recording medium is provided, by relaxing the internal stress. Accordingly, it is possible, for example, to prevent head crash and corrosion of the magnetic layer, and to improve the recording density and the reliability, significantly. It is also possible to contribute to making the magnetic spacing smaller.

DESCRIPTION OF THE PREFERRED EMBODIMENTS

Embodiments according to the present invention will be described with reference to the following figures, tables, examples, etc. It is to be understood that these figures, tables, examples, etc., plus the explanation below are for the purpose of illustrating the present invention, and do not limit the scope of the present invention. It goes without saying that other embodiments should also be included in the category of the present invention as far as they conform to the gist of the present invention. In the figures, the same sign indicates the same element. It is to be noted that the "recording medium" and "magnetic recording device" according to the present invention are applicable to recording (writing) only of magnetic information, reproducing (reading) only of magnetic information and both of the recording and reproducing of magnetic information.

In the following, the present invention will be explained mainly on hard disk devices. However, any recording medium may be a "magnetic recording medium" according to the present invention, including an in-plane recording medium, an SFM (Synthetic Ferri Coupled Medium), a vertical recording medium, and a patterned medium used for hard disk devices. Also, any magnetic recording device using such a magnetic recording medium is included in the "magnetic recording device" according to the present invention.

Figure 1:
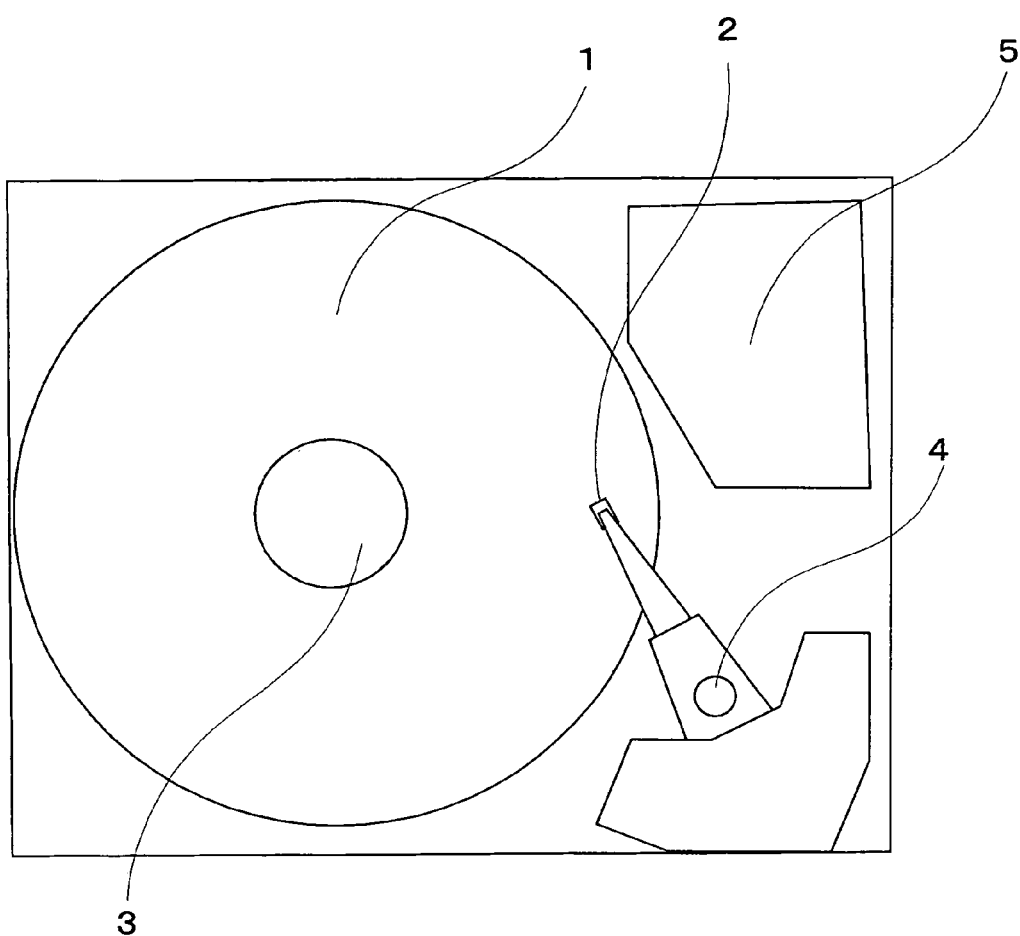
FIG. 1 is a schematic plan view illustrating the internal structure of a hard disk device.
Figure 2:
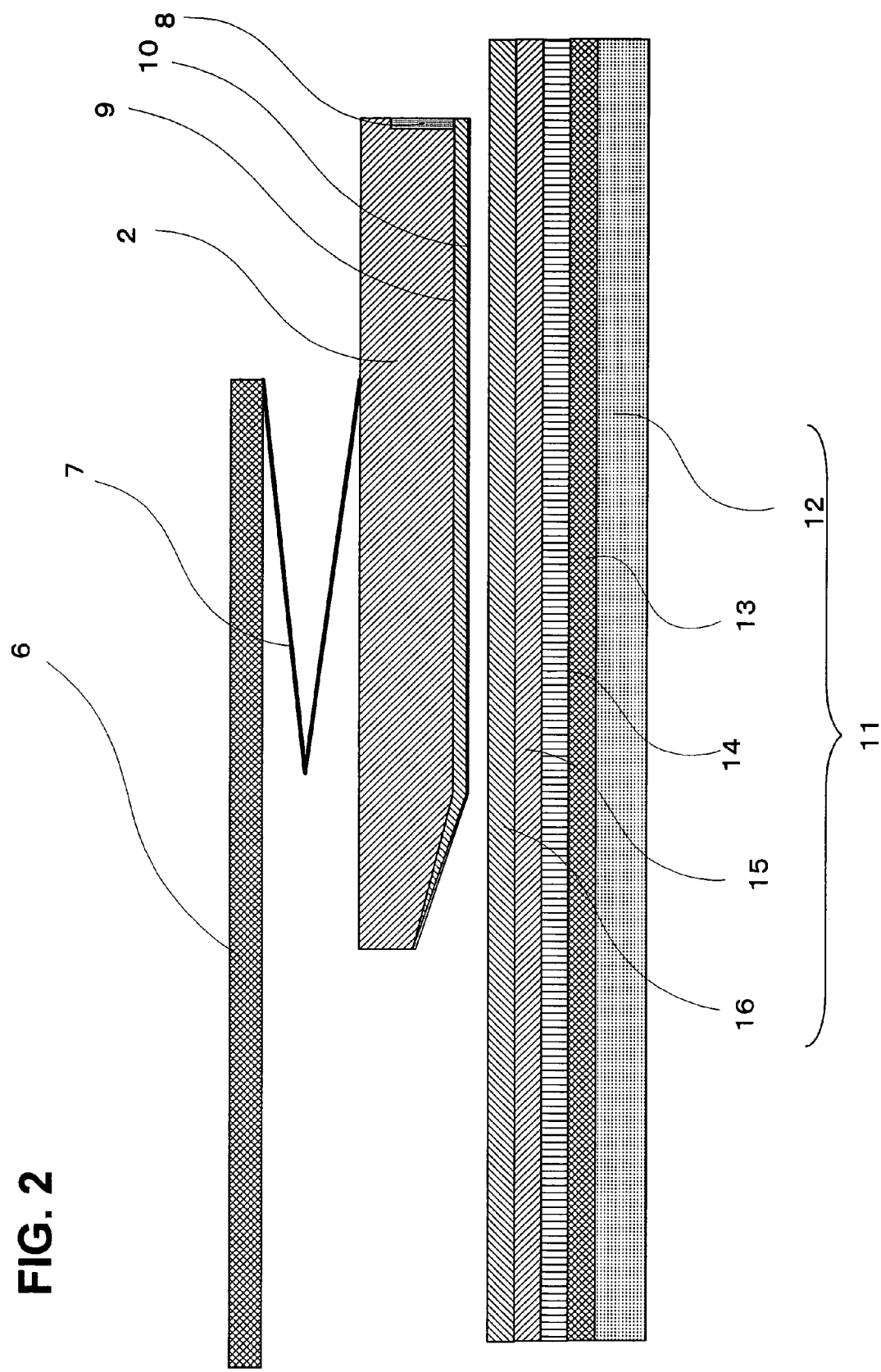
FIG. 2 is a schematic side cross-sectional view illustrating the relationship between a head and a magnetic recording medium of a hard disk device.
Figure 3:
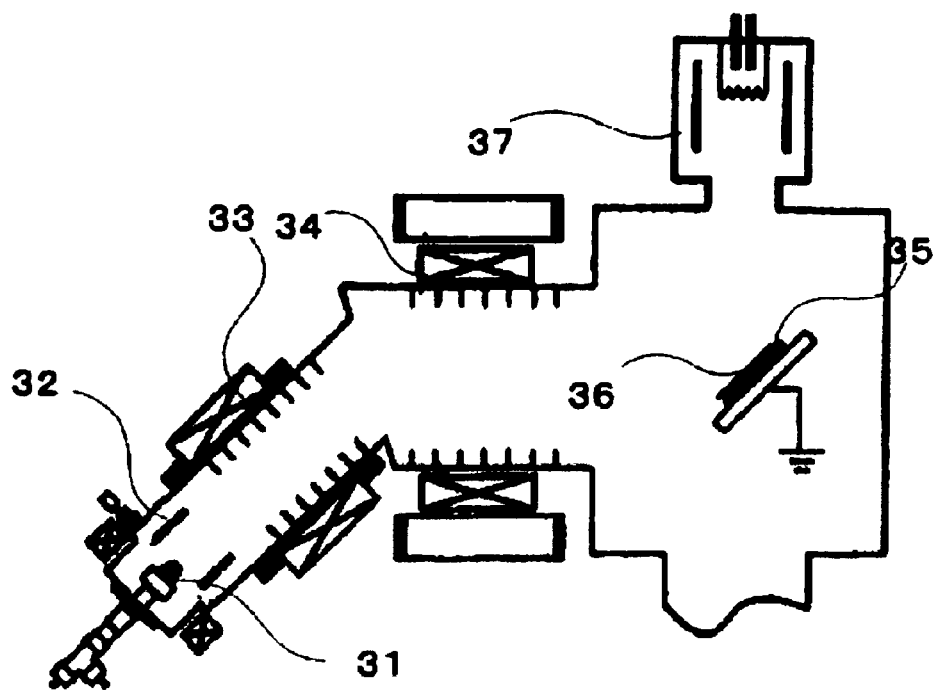
FIG. 3 is a schematic view illustrating a FCA deposition system for performing the FCA method.

FIG. 1 is a schematic plan view illustrating the internal structure of a hard disk device, and FIG. 2 is a schematic side cross-sectional view illustrating the relationship between a head and a magnetic recording medium of the hard disk device (a view taken as the device is cut along the direction vertical to the magnetic layer of the magnetic recording medium).

This hard disk device comprises, as major constituents, a magnetic recording medium 1, a head slider 2 equipped with a head, a rotation control mechanism (a spindle motor, for example) 3 of the magnetic recording medium 1, a head positioning mechanism 4 and a recorded/reproduced signal processing circuit (such as a read-write amplifier) 5, as shown in FIG. 1.

The head slider 2 is connected with the head positioning mechanism 4 by a suspension 6 and gimbals 7 for flexibly supporting the head slider 2, as illustrated in FIG. 2. A head 8 is mounted on the tip of the head slider 2. A head protective layer 9 and a head lubricant layer 10 are installed on the head slider surface.

A magnetic recording medium 11 has, in the direction from the bottom to the top of FIG. 2, a substrate 12, a Cr underlayer 13, a magnetic layer 14, a magnetic recording medium protective layer (also referred to simply as a protective layer, hereinafter) 15, a magnetic recording medium lubricant layer (also referred to simply as a lubricant layer, hereinafter) 16, etc. There are cases in which a seed layer or other layers are also installed. However, these layers are omitted in the figure. For a hard disk, the thickness of the lubricant layer is about 1 nm, the thickness of the protective layer is about 5 nm, the thickness of the magnetic layer is about 50 nm, and the thickness of the Cr underlayer is about 10 nm, in general.

As shown above, the present invention solves the above-described problems by a magnetic recording medium formed by layering on a substrate, a magnetic layer, a protective layer and a lubricant layer in this order, wherein the protective layer is composed of two layers, that is, a lower layer contacting with the magnetic layer and an upper layer on the lower layer, and the internal stress of the lower layer is smaller than that of the upper layer and the surface free energy of the lower layer is smaller than that of the upper layer.

It is possible to prevent the protective layer from being exfoliated from the magnetic layer by making the internal stress of the lower layer smaller than that of the upper layer. Specifically, the internal stress of the lower layer is preferably not more than 5 GPa. There is no particular limitation to the internal stress of the upper layer, in this case. Surface hardness is an important property for the upper layer. Specifically, the surface hardness of the upper layer is preferably not less than 20 GPa.

Furthermore, it becomes easier to prevent the intrusion of water adhered to the protective layer surface that is derived from moisture or the like, by making the surface free energy of the lower layer smaller than that of the upper layer. For example, even if there happens to occur a pin hole in the protective layer as a result of the protective layer having been made thin, and a passage is generated through which water can move from the surface of the upper layer of the protective layer to the magnetic layer, the smaller surface free energy of the lower layer will be able to prevent the water intrusion. Specifically, the surface free energy of the lower layer is preferably not more than 40 mN/m.

The upper and lower layers are not necessarily clearly discernable from each other, physically or compositionally. It is sufficient if the above-described relationship holds when an upper layer part and a lower layer part of a protective layer are compared.

Such a combination of upper and lower layers can be easily selected by actually forming them as single layers, measuring the internal stress and the surface free energy, and comparing the data. Also, it is considered that in many cases, an appropriate combination can be found, for example, by using, when forming the lower layer, one or more second materials as well as a first material for forming the upper layer, the second material or materials being selected to be able to lower the surface free energy. The internal stress can be lowered owing to the relaxation of the bonding distortion by the co-existence of the second material, and the lowering of the surface free energy can be realized as a film by selecting, as the second material, those that can lower the surface free energy.

Figure 4:
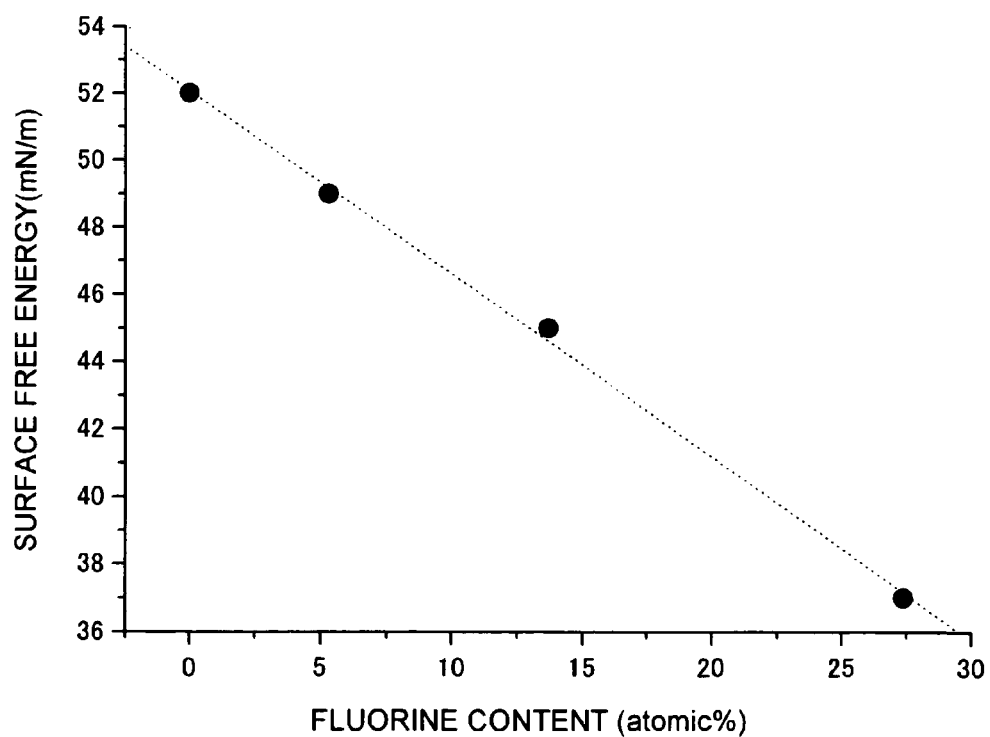
FIG. 4 is a graph indicating the relationship between the fluorine content in a DLC formed by the FCA method, and the surface free energy.

To be specific, there is a method in which the FCA method is employed, and when the lower layer is formed, doping is performed by ion assisting, using an ion gun or the like so as to have an element or elements other than carbon coexist in the lower layer. Besides that, sputtering, CVD or the like can be enumerated. It is preferable to use, as an element for coexistence, hydrogen, fluorine or the like that improves the water repelling properties when it is in the state of being bound with carbon. This is because both the internal stress and the surface free energy can be reduced at the same time. Both hydrogen and fluorine may coexist. FIG. 4 is a graph indicating the relationship between the fluorine content in a DLC formed by the FCA method, and the surface free energy. A hydrogen gas may be used as a raw material for the hydrogen addition, and tetrafluoromethane may be used as a raw material for the fluorine addition.

Any material may be used for the composition of the upper layer. One that has an amorphous carbon as a main component is preferable. Si and SiC may also be used.

Any method can be applied besides the above-described FCA method for obtaining an amorphous carbon. It is to be noted that "a main component" according to the present invention means that the component exceeds 50 atom %. For the composition of the upper layer, it is more preferable that not less than 90 atom % is carbon.

It is to be noted that the film hardness can be raised by compacting the composition of the layer, for example, by having more $sp^3$ carbon structure. From this viewpoint, it is preferable for the upper layer to have a density not less than 2.5 $g/cm^3$. An amorphous carbon is particularly preferable.

As for a composition of the lower layer, the lower layer preferably comprises an amorphous carbon and at least one of hydrogen and fluorine, as main components. The "main components" in this case means that the total of the amorphous carbon, hydrogen and fluorine exceeds 50 atom %. It is more preferable that the total of the amorphous carbon, hydrogen and fluorine is not less than 99 atom %. In addition, the content of the amorphous carbon in the composition of the lower layer is preferably from 50 to 80 atom % from the viewpoint of having a proper internal stress value and a proper surface free energy value.

Other atoms such as hydrogen and fluorine may be contained in the upper layer, unless they are against the purpose of the present invention. However, they are often unfavorable because the film hardness is degraded. When hydrogen and fluorine are contained, it is important that the total content of the hydrogen and fluorine in the lower layer is larger than that in the upper layer, from the viewpoint of having an appropriate internal stress value and an appropriate surface free energy value.

To realize such a combination of an upper layer and a lower layer, it is preferable that the composition of the lower layer is one in which hydrogen or fluorine or both hydrogen and fluorine are contained together with a composition that is the same as that of the upper layer. This is because the upper and lower layers can be manufactured easily, using the same equipment and applying roughly the same steps.

In such a case, for example, when a certain element is added to the lower layer by doping, and no doping is performed to the upper layer, a step for removing the element for doping completely from the system before forming the upper layer, or similar step, may or may not be added. Sometimes, merely cutting off the supply of the element for doping may be sufficient. Furthermore, it may be possible to employ a method in which concentration gradient of the doping element occurs due to gradual decrease of the supply of the doping element. As state earlier, in the upper and lower layers according to the present invention, the boundary can be as ambiguous as this embodiment.

It is to be noted that doping with a metal, nitrogen or oxygen should be avoided for both the upper and lower layer from the viewpoint of prevention of water intrusion. Although inclusion of these elements can reduce the internal stress, addition of these elements will make a carbon film hydrophilic, with the result that the corrosion resistance will be deteriorated. However, it is also to be noted that, from the viewpoint of increasing the affinity to a lubricant, such an element may be included in the top surface portion of the upper layer.

Employing such a combination of upper and lower layers as described above is preferable since it is possible to make the thickness of the protective layer not more than 5 nm, and a narrower magnetic spacing can be met easily. Furthermore, if it is possible, in the combination of upper and lower layers, to determine the thicknesses of the respective upper and lower layers by some means or other methods, the ratio of the film thickness of the lower layer to that of the upper layer is preferably in the range of from 3:7 to 7:3. If the lower layer is thinner than this range, there would be more problems of exfoliation and corrosion. If the lower layer is thicker than this range, it is difficult to maintain sufficient mechanical strength and surface hardness for a protective layer. It is to be noted that various functional groups such as OH and COOH may be added to the upper surface of the upper layer to improve the affinity to the lubricant.

As explained above, with a magnetic recording medium having a protective layer according to the present invention, it is possible to improve the recording density and the reliability significantly. Accordingly, it is possible to obtain a magnetic recording device having both high recording density and high reliability.

EXAMPLES

Next, examples and comparative examples according to the present invention will be described in detail. It is to be noted that the physical properties were determined as follows.

(Hydrogen Content, Fluorine Content, and Film Density)

The film density and the fluorine content were quantitatively determined by the Rutherford Back Scattering Spectroscopy (RBS), and the hydrogen content, by the Elastic Recoil Detection Analysis (ERDA).

(Film Hardness)

The nanoindentation method was used for determining the film hardness. The nanoindentation method is a method in which a diamond indenter is pressed into a material by means of a tiny amount of load on the order of a μN so that mechanical properties are evaluated by measuring a tiny deformation under the unloading. Since the pressed-in amount can be limited to several nm, it is suitable for evaluating properties of thin film samples.

(Internal Stress)

The internal stress was measured by using a thin-film stress measuring apparatus. The principle is that a stress is determined by measuring the change in the curvature radius of a substrate before and after the deposition of a film onto the substrate, and substituting appropriate data for each parameter of equation (1).

$$\sigma = \frac{Eh^2}{(1-v)6Rt} \quad (1)$$

Hereupon, $E/(1-v)$ is an elastic coefficient of the substrate, h is the thickness of the substrate (m), t is a film thickness (m), R is the curvature radius of the substrate (m), and $\sigma$ is the average stress of the thin film (Pa).

(Surface Free Energy of a Film)

Surface free energy is determined by measuring the contact angles of pure water and diiodomethane on a film object, followed by the calculation using the following equations.

When $\gamma_S$ is a surface free energy of a solid sample, $\gamma_L$ is a surface free energy of a liquid sample, $\theta_{SL}$ is a contact angle of a solid sample/liquid sample, and $\gamma_{SL}$ is an interfacial free energy of a solid sample/liquid sample, then the Young's equation as shown in equation (2) holds.

$$\gamma_S = \gamma_L \cdot \cos\theta_{SL} + \gamma_{SL} \quad (2)$$

On the other hand, the adhesion work $W_{SL}$, or an energy for the stabilization by adherence of a liquid to the surface of a solid, follows the Dupre equation (3).

$$\gamma_S + \gamma_L = W_{SL} + \gamma_{SL} \quad (3)$$

The Young-Dupre equation (4) is derived from the two equations, and accordingly, the adhesion work can be obtained from the surface free energy and a contact angle of a liquid.

$$W_{SL} = \gamma_L(1+\cos\theta_{SL}) \quad (4)$$

Equation (5) holds when the geometric mean rule for each surface free energy component is applied to the adhesion work.

$$W_{SL} = 2\sqrt{(\gamma_S^d \cdot \gamma_L^d)} + 2\sqrt{(\gamma_S^h \cdot \gamma_L^h)} \quad (5)$$

Here, d and h are a dispersion component and a hydrogen bonding component, respectively.

The following relationship holds regarding the adhesion work when two different liquids (i,j) are used.

$$\begin{pmatrix} W_{SL}^i \\ W_{SL}^j \end{pmatrix} = 2 \begin{pmatrix} \sqrt{\gamma_L^{d,i}} & \sqrt{\gamma_L^{h,i}} \\ \sqrt{\gamma_L^{d,j}} & \sqrt{\gamma_L^{h,i}} \end{pmatrix} \begin{pmatrix} \sqrt{\gamma_S^d} \\ \sqrt{\gamma_S^h} \end{pmatrix} \quad (6)$$

Accordingly, if the adhesion work is determined through actually measuring contact angles for two different liquids, the surface free energy of a solid can be obtained for each component by the following relationship. This relationship is called the Fowkes equation. Furthermore, the surface free energy: $\gamma = \gamma^d + \gamma^h$ can be obtained from the relationship.

$$\begin{pmatrix} \sqrt{\gamma_S^d} \\ \sqrt{\gamma_S^h} \end{pmatrix} = \frac{1}{2} \begin{pmatrix} \sqrt{\gamma_L^{d,i}} & \sqrt{\gamma_L^{h,i}} \\ \sqrt{\gamma_L^{d,j}} & \sqrt{\gamma_L^{h,i}} \end{pmatrix}^{-1} \begin{pmatrix} W_{SL}^i \\ W_{SL}^j \end{pmatrix} \quad (7)$$

(Durability Test)

The durability was evaluated by contacting an alumina pin with a tip having a diameter of 2 mm with a completed magnetic recording medium of an example or a comparative example and making it slide over the surface at a rotation speed of 80 rpm until the carbon-type protective layer is damaged. The damage was detected by the change in the frictional force, generation of scars caused by the sliding on the surface of the magnetic recording medium, the fact that a part where the protective layer was lost was found by the observation under an electronic microscope, or the like.

(Corrosion Test)

A completed magnetic recording medium was left standing at room temperature for 24 hours. After the standing, a dilute nitric acid in an amount of 1 mL was put dropwise onto the surface of the magnetic recording medium. After 1 hour, the dropped dilute nitric acid was sucked for recovery, and was subjected to an elemental analysis by inductively-coupled plasma mass spectroscopy (ICP-MS).

Example 1

Figure 5:
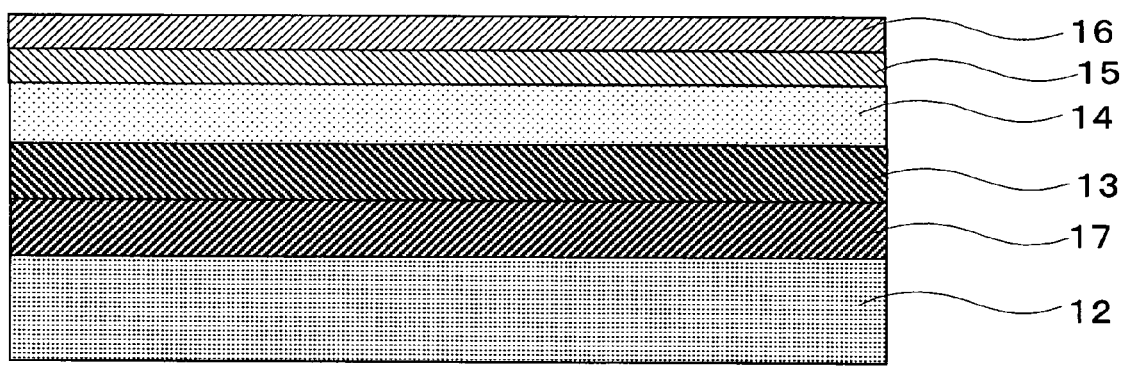
FIG. 5 is a schematic side cross-sectional view illustrating a magnetic recording medium according to the examples and comparative examples.

FIG. 5 is a schematic cross-sectional view of a magnetic recording medium prepared in this EXAMPLE 1. A Ni—P plating layer 17 was formed on an aluminum alloy substrate 12. On the Ni—P plating layer 17, a Cr underlayer 13 and a magnetic layer 14 were formed by sputtering sequentially.

Next, using an FCA apparatus and a graphite target as a raw material, a 2-nm thick carbon-type protective layer was deposited as the lower layer at a deposition speed of 0.1 nm/second, under the conditions: 60 A for the arc current; 30 V for the arc voltage; and 10 A for the current of the cathode coil. During the deposition, a hydrogen gas was supplied to the system to perform ion assisting with hydrogen plasma under the conditions: 500 V for the beam voltage; and 500 A for the beam current, using an ion source equipped inside the deposition chamber, to form a carbon-type protective layer composed of an amorphous carbon and hydrogen. The film properties of a single film (without an upper layer) formed by these conditions are indicated in TABLE 1.

Afterwards, hydrogen was fully removed, and a 3-nm thick carbon-type protective layer 15 from an amorphous carbon was deposited as an upper layer. The film properties of a single film (without a lower layer) formed by this condition are indicated in TABLE 2.

On the protective layer having a thickness of 5 nm as a total for the upper and lower layers, a lubricant layer 16 was formed in a 1-nm film thickness by applying a lubricant solution by a pulling-up method under the condition of a immersion time of 30 seconds, the lubricant solution being an about 0.2% by volume solution of Fomblin TETRAOL from an Italian company Audimond diluted with hydrodecafluoropentane. Magnetic recording media were thus completed.

As a result of the durability test, the protective layer was not damaged, even after surpassing 10,000 times of rotation. Furthermore, when the corrosion test was conducted to the completed samples that had not been subjected to the durability test, the eluted amount of cobalt that was a major element of the magnetic layer was 1.2 μg/m².

Comparative Example 1

After having layered up to a magnetic layer in the same processes as for EXAMPLE 1, using an FCA apparatus and a graphite target as a raw material, a 5-nm thick carbon-type protective layer was deposited at a deposition speed of 0.1 nm/second, under the conditions: 60 A for the arc current; 30 V for the arc voltage; and 10 A for the current of the cathode coil. The film properties under these conditions are indicated in TABLE 2.

Next, magnetic recording media were completed, using Fomblin TETRAOL of an Italian company Audimond and in the same processes as for EXAMPLE 1.

As a result of the durability test, the protective layer was not damaged, even after surpassing 10,000 times of rotation. However, when the corrosion test was conducted to the completed samples that had not been subjected to the durability test, the eluted amount of cobalt that was a major element of the magnetic layer was 3.8 μg/m², which was higher when compared with EXAMPLE 1.

Comparative Example 2

After having layered up to a magnetic layer in the same processes as for EXAMPLE 1, using an FCA apparatus and a graphite target as a raw material, a 5-nm thick carbon-type protective layer was deposited at a deposition speed of 0.1 nm/second, under the conditions: 60 A for the arc current; 30 V for the arc voltage; and 10 A for the current of the cathode coil. During the deposition, a hydrogen gas was supplied to the system to perform ion assisting with hydrogen plasma under the conditions: 500 V for the beam voltage; and 500 A for the beam current, using an ion source equipped inside the deposition chamber. The film properties under these conditions are indicated in TABLE 1.

Next, magnetic recording media were completed, using Fomblin TETRAOL of an Italian company Audimond and in the same processes as for EXAMPLE 1.

As a result of the durability test in the same way as for EXAMPLE 1, the protective layer was damaged before 10,000 times of rotation. However, when the corrosion test was conducted to the completed samples that had not been subjected to the durability test, the eluted amount of cobalt that was a major element of the magnetic layer was 1.3 μg/m², which was on the same level as EXAMPLE 1.

Example 2

Protective layers were prepared in the same way as for EXAMPLE 1, except that tetrafluoromethane was used instead of a hydrogen gas, and was evaluated in the same way as for EXAMPLE 1. The film properties of a single film (without an upper layer) formed by this condition are indicated in TABLE 3.

As a result of the durability test, the protective layer was not damaged, even after surpassing 10,000 times of rotation. Furthermore, when the corrosion test was conducted to the completed samples that had not been subjected to the durability test, the eluted amount of cobalt that was a major element of the magnetic layer was 1.1 μg/m².

Comparative Example 3

Protective layers were prepared in the same way as for COMPARATIVE EXAMPLE 2, except that tetrafluoromethane was used instead of a hydrogen gas, and was evaluated in the same way as for COMPARATIVE EXAMPLE 2. The film properties under this condition are indicated in TABLE 3.

As a result of the durability test, the protective layer was damaged before 10,000 times of rotation. However, when the corrosion test was conducted to the completed samples that had not been subjected to the durability test, the eluted amount of cobalt that was a major element of the magnetic layer was 1.2 μg/m², which was on the same level as EXAMPLE 1.

TABLE 1

| Hydrogen content (atom %) | Film density (g/cm³) | Film surface hardness (GPa) | Internal stress (GPa) | Surface free energy (mN/m) |
| --- | --- | --- | --- | --- |
| 35 | 2.1 | 18 | 3.2 | 40 |

TABLE 2

| Hydrogen content (atom %) | Film density (g/cm³) | Film surface hardness (GPa) | Internal stress (GPa) | Surface free energy (mN/m) |
| --- | --- | --- | --- | --- |
| 0 | 3.1 | 32 | 6.2 | 52 |

TABLE 3

| Fluorine content (atom %) | Film density (g/cm³) | Film surface hardness (GPa) | Internal stress (GPa) | Surface free energy (mN/m) |
| --- | --- | --- | --- | --- |
| 27 | 2.0 | 22.2 | 3.3 | 37 |

What is claimed is:

1. A magnetic recording medium formed by layering on a substrate, a magnetic layer, a protective layer and a lubricant layer in this order, wherein:
    said protective layer consists only of two layers, that is, a lower layer contacting with the magnetic layer and an upper layer on the lower layer;
    the internal stress of the lower layer is smaller than that of the upper layer; and
    the surface free energy of the lower layer is smaller than that of the upper layer,
    wherein both of said lower layer and said upper layer are formed by deposition by the Filtered Cathodic Arc method,
    wherein said lower layer comprises an amorphous carbon and fluorine as main components, and said upper layer comprises an amorphous carbon as a main component.

2. A magnetic recording medium according to claim 1, wherein not less than 90 atom % of said upper layer is composed of carbon.

3. A magnetic recording medium according to claim 1, wherein from 50 to 80 atom % of said lower layer is composed of carbon.

4. A magnetic recording medium according to claim 1, wherein the total content of hydrogen and fluorine in said lower layer is larger than that of said upper layer.

5. A magnetic recording medium according to claim 1, wherein the composition of said lower layer is formed by adding hydrogen, or fluorine, or hydrogen and fluorine to a composition that is the same as that of the upper layer.

6. A magnetic recording medium according to claim 1, wherein said lower layer has an internal stress of not more than 5 GPa.

7. A magnetic recording medium according to claim 1, wherein said lower layer has a surface free energy of not more than 40 mN/m.

8. A magnetic recording medium according to claim 1, wherein said upper layer has a hardness of not less than 20 GPa.

9. A magnetic recording medium according to claim 1, wherein said upper layer has a density of not less than 2.5 g/cm3.

10. A magnetic recording medium according to claim 1, wherein the ratio of the film thickness of said lower layer to that of said upper layer is in the range of from 3:7 to 7:3.

11. A magnetic recording medium according to claim 1, wherein the film thickness of said protective layer is not more than 5 nm.

12. A magnetic recording device equipped with a magnetic recording medium according to one of claims 1, 2 and 3 to 11.

* * * * *